United States Patent [19]

Grazine

[11] 3,836,305

[45] Sept. 17, 1974

[54] TRIGGER BAR ACTUATOR FOR MOLDING MACHINE

[75] Inventor: William Grazine, Piscataway, N.J.

[73] Assignee: Farrell Patent Company, Dunellen, N.J.

[22] Filed: June 25, 1973

[21] Appl. No.: 372,922

[52] U.S. Cl. ......... 425/242 B, 425/156, 425/326 B, 425/387 B, 425/464
[51] Int. Cl. ............................ B29c 5/06, B29c 6/04
[58] Field of Search .... 425/156, 437, 326 B, 242 B, 425/387 B, 464

[56] References Cited
UNITED STATES PATENTS
3,079,637  3/1963  Marzillier ..................... 425/387 B Primary Examiner—J. M. Meister
Attorney, Agent, or Firm—Sandoe, Hopgood & Calimafde

[57] ABSTRACT

This indexing head for blow molding apparatus has a plurality of core rods projecting from each of the side faces of the head. A trigger bar is located in a recess of each side face in position to actuate simultaneously all of the valves in the core rods of the face in which the trigger bar is located. This effects blowing of parisons on the core rods when the core rods are at a blowing station. The head has improved and more reliable actuating mechanism for moving the trigger bar. Freely movable balls serve as motion-transmitting means for changing the direction of motion from a thrustor to the trigger bar by cam action of one ball against the other.

10 Claims, 4 Drawing Figures

PATENTED SEP 17 1974 3,836,305

TRIGGER BAR ACTUATOR FOR MOLDING MACHINE

BACKGROUND AND SUMMARY OF THE INVENTION

Blow molding machines conventionally have indexing heads with side faces which register with operating stations of the machine as the indexing head is turned successively to bring the different faces to the different operating stations. One or more core rods project from each face of the indexing head.

The core rods are coated with a parison at one station, which is usually an injection station, and the indexing head turns to move the parison coated core rods to a blowing station. Each core rod has a valve for controlling discharge of air from the core rod to blow the parison to the shape of the blow mold cavities into which the different core rods extend.

The air control valves are operated by operating elements actuated from mechanism in the indexing head. A trigger bar extends lengthwise across the ends of the operating elements for the different core rod valves and this trigger bar must be moved forward to operate all of the operating elements of valves simultaneously.

This invention combines with the trigger bar, novel motion-transmitting mechanism for converting an upward motion of a thrustor to a horizontal motion of the trigger bar and operating elements for the valves.

In the preferred construction, a plunger operated by the thrustor pushes a curved surface upward in contact with a complementary curved surface on a portion of the motion-transmitting mechanism that moves horizontally with the trigger bar and valve-operating elements. These curved surfaces exert a cam action for transmitting the motion around a juncture at which the angularly related parts of the operating mechanism must transmit the force.

Balls are used as the curved surfaces in the illustrated embodiment of the invention. The balls have the important advantage that they can move angularly in any and changing directions to distribute any friction over such extensive areas that no wear of the motion-transmitting mechanism occurs as the result of the cam action.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
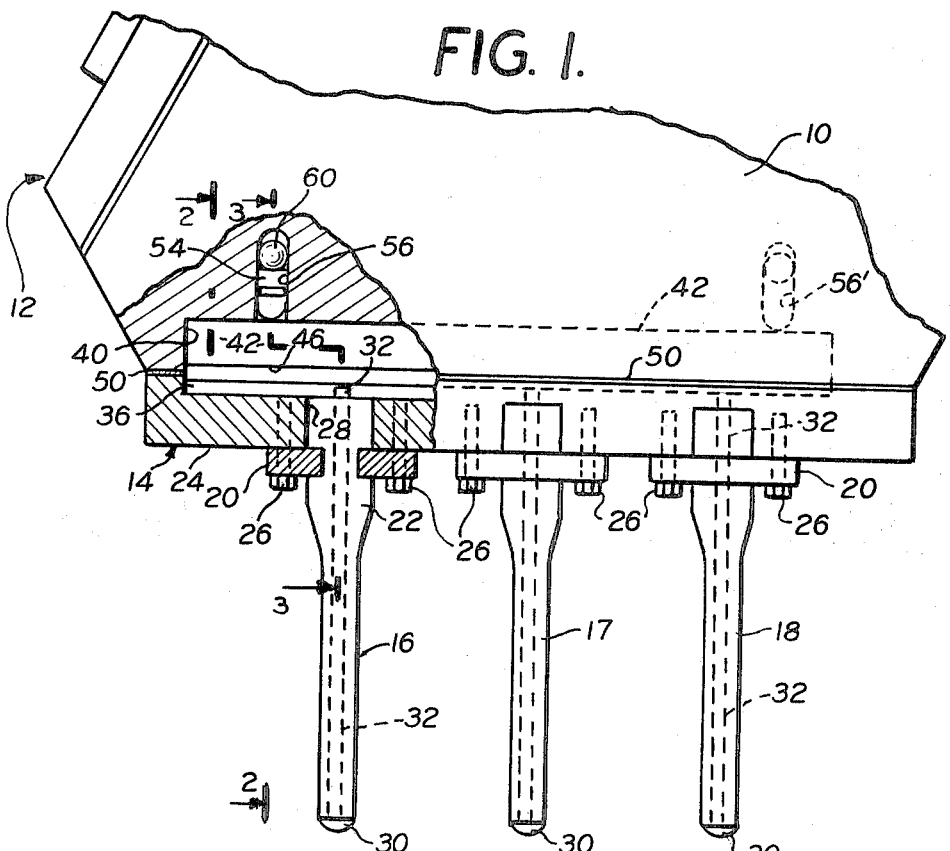
FIG. 1 is a fragmentary, diagrammatic view, partly broken away, showing a portion of an indexing head of a blow molding machine having three faces from which core rods extend.

FIG. 1 shows an indexing head 10 which is of triangular shape and has three faces, only two of which are shown in FIG. 1. A portion of one face 12 is shown at the left of FIG. 1 and most of a face 14 is shown extending horizontally in FIG. 1. The reference characters for these faces 12 and 14 designate the faces of the indexing head 10 with the assembled structure that forms the working face of the indexing head when the apparatus is in operating condition.

There are three core rods 16, 17 and 18 secured to the indexing head 10 by split collars 20 that extend into circumferential grooves 22 at the inner end portions of the core rods.

These split collars 20 are secured to a face plate 24 by screws 26 that extend through the split collars 20 and that thread into the face plate 24.

The face plate 24 is secured to the indexing head by other screws, not shown, which is a conventional molding machine construction.

There are openings 28 in the face plate 24 for holding the core rods in parallel positions with one another and extending outwardly at right angles to the face 14 of the indexing head.

Each of the core rods 16, 17 and 18 has a valve 30 secured to the outer end of an operating element 32 which extends lengthwise of the hollow core rod and somewhat beyond the end of the core rod, the exposed end of the operating element 32 being shown in the portion of FIG. 1 that is in section. Springs in the core rods hold the valves 30 closed; and when the operating element 32 has its inner end pushed in the direction of the valve 30 with sufficient force to overcome the spring, the valve 30 opens. The springs are not shown in FIG. 1 since this description is of conventional structure well understood in the molding machine art. The core rods 16, 17 and 18 are conventional core rods, and are representative of core rods generally.

Figure 3:
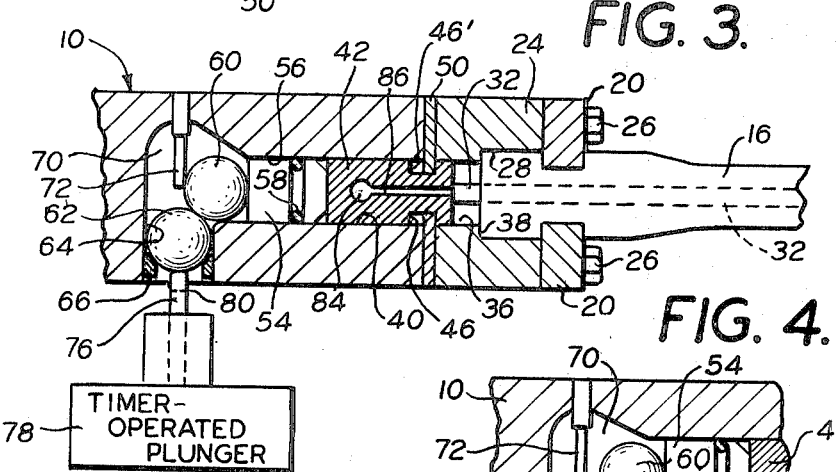
FIG. 3 is an enlarged sectional view taken on the section line 3—3 of FIG. 1.

The face plate 24 has a groove 36, of rectangular cross section, extending for most of the length of the face plate 24 and into which the operating elements 32 of each core rod extend. This groove 36 is of a height slightly less than the diameter of the openings 28 into which the core rods extend. This construction is best shown in FIG. 3 which illustrates the way in which shoulders 38 are formed at the upper and lower parts of the openings 28 as the result of the lesser height of the groove 36.

There is a corresponding groove 40 (FIG. 1) in the indexing head 10 immediately behind the groove 36 and these grooves 36 and 40 cooperate to form a chamber in which a trigger bar 42 is located.

Figure 2:
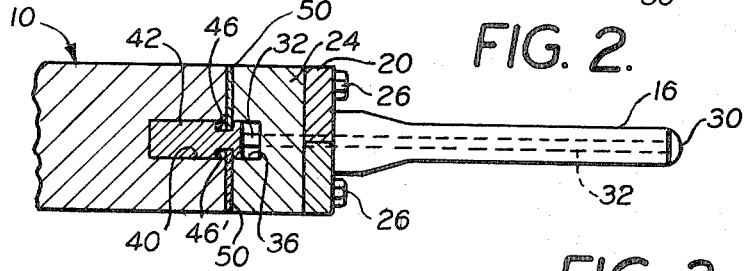
FIG. 2 is a sectional view on the line 2—2 of FIG. 1.

The trigger bar extends for substantially the entire length of the grooves 36 and 40 with enough clearance from the sides and the ends of the grooves to permit the trigger bar to move freely in the grooves toward and from the inner ends of the core rods 16, 17 and 18. This construction is clearly shown in FIG. 2.

The trigger bar 42 has a groove 46 extending for the full length of the upper side of the trigger bar and there is a similar groove 46' in the bottom face of the trigger bar 42.

Referring again to FIG. 2, there are thin plates 50 clamped between the face plate 24 and the opposing face of the indexing head 10. These thin plates contact with one another beyond both ends of the trigger bar 46; but they are spaced to provide clearance for the trigger bar 46 along the length of the grooves 36 and 40. The thin plates 50 extend into the grooves 46 and 46' and provide abutments which limit the movement of the trigger bar 42 toward and from the core rods.

FIG. 3 shows the trigger bar 42 in its most retracted position; that is furthest away from the core rod 16, shown in FIG. 3; and similarly spaced from the other core rods. The slots 46 and 46' are wide enough to permit the trigger bar 42 to move toward the core rods with sufficient motion to move the operating elements 32 to a position to open the core rod valves.

There is a piston 54 behind the trigger bar 42 and this piston 54 slides in a cylindrical guide 56 and is provided with an O-ring 58 for preventing air from escaping past the piston 54 from the chamber in which the trigger bar 42 slides.

There is an upper ball 60 which projects partway into the cylindrical guide 56.

A lower ball 62 moves up and down in another cylindrical guide 64 which extends substantially at right angles to the cylindrical guide 56. A threaded bushing 66 screws into the lower end of the cylindrical guide 64 to prevent the lower ball 62 from dropping out of the guide 64. This bushing 66 can also be used to control the at-rest position of the lower ball 62.

The cylindrical guides 56 and 64 open into a juncture chamber 70 in which there is a stud 72 extending downward into the juncture chamber in a position to serve as a stop for preventing the upper ball 60 from rolling out of its cylindrical guide 56. This stud 72 also acts as an abutment to limit the upward movement of the lower ball 62 so that the lower ball can never move high enough to bring the balls 60 and 62 into alignment in the direction of the axis of the cylindrical guide 56. Movement of the balls 60 and 62 into such a position would prevent the lower ball from exerting any cam action on the upper ball when the lower ball is pushed upwardly.

A plunger 76 is operated by an actuator 78 which moves the plunger up and down in timed relation with the operation of the indexing head and the mold opening and closing apparatus.

When the indexing head 10 is to be rotated to bring a different set of core rods to the blowing station, the actuator 78 is at rest with the plunger 76 depressed so that its upper end is at the level indicated by the dotted line 80.

Figure 4:
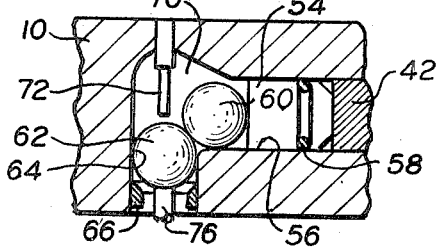
FIG. 4 is a view showing portions of the structure of FIG. 3 when the motion-transmitting mechanism is in position to open the valves on the core rods.

When the core rod 16, and the other core rods projecting from the same face, move into blowing positions, and the blowing mold closes around the core rods, the actuator 78 moves the plunger 76 upwardly into contact with the lower ball 62 and lifts the lower ball 62 upwardly far enough to displace the upper ball 60, as shown in FIG. 4, to move the trigger bar 42 into position to open the valves of the core rods.

At the end of the blowing operation, the actuator 78 returns the plunger 76 to its depressed, inactive position; and the springs of the core rod valves push the operating element 32, trigger bar 42, piston 54, and balls 60 and 62 back to their original positions as shown in FIG. 3.

Air for the core rods is supplied under pressure to the chamber formed by the grooves 36 and 40 and the distribution of the air lengthwise through this chamber is facilitated by having a manifold passage 84 extending lengthwise of the trigger bar 42 with spaced outlet passages 86, one of which is shown in FIG. 3.

There is another cylindrical guide 56' (FIG. 1) near the right hand end of the trigger bar 42 and corresponding in all respects to the cylindrical guide 56 and its motion-transmitting mechanism which is illustrated in FIG. 3. Thus the trigger bar is moved simultaneously by pressure near each end of the trigger bar so as to move it parallel to itself as it actuates the operating elements of the different core rods 16, 17 and 18. The actuating mechanism for the motion-transmitting connections at both end portions of the trigger bar operate simultaneously from the same timer control of the molding machine.

The balls 60 and 62 are free to rotate and they have some random rotation which causes different locations on the surfaces of the balls to contact with each other at different times so that the cam action of the balls with respect to one another does not result in friction wear at any particular point of contact of the balls.

The preferred embodiment of the invention has been illustrated and described, but changes and modifications can be made and some features can be used in different combinations without departing from the invention as defined in the claims.

What is claimed is:

1. In a molding machine having a valve for controlling an operation of the machine including in combination an operating element for displacing the valve, a timer-operated plunger, guides in which the operating element and the plunger move along axes in directions that are in angular relation to one another, and motion-transmitting mechanism between the plunger and the operating element including a rounded surface that moves with the plunger, a second rounded surface that moves with the operating element, said rounded surfaces contacting with one another for a cam action that transmits motion between the plunger and the operating element through an angle proportional to the angular difference in the directions of movement of the plunger and operating element, and stop means for limiting the movement of the rounded surfaces to maintain them in their cam relationship with one another.

2. The apparatus described in claim 1, characterized by one of the rounded surfaces being the surface of a ball, and a guide along which the ball moves toward and from the other rounded surface, and the stop being in position to prevent the ball from moving beyond the ends of its guide.

3. The apparatus described in claim 1 characterized by both of the rounded surfaces being the surfaces of balls, guides in which each of the balls roll along courses that are at substantially the same angular relation as the angular directions of movement of the plunger and the operating element, the balls contacting with each other beyond diametral cross sections in planes normal to one another, the stop means being in position to prevent the point of contact of each of the balls with the other from passing beyond a normal through the center of either of said diametral cross sections.

4. The apparatus described in claim 1 characterized by there being a plurality of valves, and a different operating element for displacing each of the valves, a trigger bar that extends across the ends of the different operating elements, a guide bearing in which the trigger bar moves transversely of its length to displace the different operating elements for the different valves, the trigger bar being part of the motion-transmitting mechanism between the plunger and the operating elements.

5. The apparatus described in claim 4 characterized by an indexing head for the molding machine with different faces in angular relation to one another, a plurality of core rods projecting from each face, there being a valve for each core rod controlling flow of air through the core rod during a blowing operation of the molding machine, brackets connecting the core rods to the head with the core rods terminating in air spaces in the head and with the operating elements for the core rods extending from the indexing head ends of the core rods into said air spaces, and a trigger bar in each face of the indexing head.

6. The apparatus described in claim 5 characterized by a generally cylindrical guide extending from each trigger bar guide bearing in a direction away from the core rods, a piston in each of the guides with a sealing ring for preventing escape of air from the air spaces and around the sides of the pistons, said pistons being part of the motion-transmitting mechanism between the plungers and the valve operating elements, said pistons being propelled toward the trigger bar by pressure of different curved surfaces of the motion-transmitting mechanism against one another.

7. The apparatus described in claim 1 characterized by the first rounded surface being part of the surface of a first metal ball, and the second rounded surface being part of the surface of a second metal ball, the first ball being thrust upward in its guide by the plunger, a stop limiting the upward movement of the first ball, the second ball contacting with the upper hemisphere of the first ball at a location where upward movement of the first ball moves the second ball horizontally in its guide, an abutment that limits the second ball to positions that contact locations on the side of the first ball where upward movement of the first ball thrusts the second ball in a generally horizontal direction along the guide for the second ball to transmit motion to the operating element for the valve.

8. The apparatus described in claim 7 characterized by the guides for the balls being generally cylindrical and meeting at a generally right angular relation to one another, and the balls being of about the same diameter and substantially filling the cross section of the guides and having running clearance in said guides.

9. The apparatus described in claim 5 characterized by there being at least three core rods extending from each face of the indexing head, and there being two timer-operated plungers and two motion-transmitting mechanisms behind each trigger bar for moving the trigger bar in a direction to cause the operating elements to open the valve and to supply air through the core rods for a blowing operation.

10. The apparatus described in claim 1 characterized by the rounded surfaces being surfaces of two different balls, angularly related guides in which the respective balls move lengthwise of their respective guides, said guides coming together at a junction chamber, and restraining means limiting the movement of the balls with respect to one another to positions of contact with one another in which movement of either ball toward the junction chamber displaces the other ball in a direction away from the junction chamber.

* * * * *